United States Patent [19]

Schiessle et al.

[11] Patent Number: 5,400,656
[45] Date of Patent: Mar. 28, 1995

[54] DEVICE FOR MEASURING MECHANICAL STATES OF STRESS IN COMPONENTS

[75] Inventors: Edmund Schiessle, Schorndorf; Khaldoun Alasafi, Schwäbisch-Gmünd; Ralf Gutöhrlein, Fellbach-Schmiden, all of Germany

[73] Assignee: Mercedes-Benz AG, Stuttgart, Germany

[21] Appl. No.: 293,934

[22] Filed: Aug. 22, 1994

Related U.S. Application Data

[63] Continuation of Ser. No. 11,153, Jan. 29, 1993, abandoned.

[30] Foreign Application Priority Data

Jan. 30, 1992 [DE] Germany ............... 42 02 536.2

[51] Int. Cl.⁶ ................................. G01B 7/02
[52] U.S. Cl. ................... 73/779; 73/862.336; 324/209
[58] Field of Search ............ 73/775, 776, 779, 862.69, 73/862.336, DIG. 2; 324/209

[56] References Cited

U.S. PATENT DOCUMENTS

| | | | |
|---|---|---|---|
| 4,646,576 | 3/1987 | Kita | 73/779 |
| 4,991,447 | 2/1991 | Yahagi et al. | 73/862.336 |
| 5,036,713 | 8/1991 | Ikeda et al. | 73/779 |
| 5,146,790 | 9/1992 | Fish | 73/862.336 |
| 5,165,286 | 11/1992 | Hamamura et al. | 73/779 |

FOREIGN PATENT DOCUMENTS

| | | |
|---|---|---|
| 3819083 | 4/1990 | Germany . |
| 4121507 | 1/1992 | Germany . |
| 60-42628 | 3/1985 | Japan ............... 73/862.336 |

OTHER PUBLICATIONS

Meyers Lexikon der Technik und der exakten Naturwissenschaften, Johannes Kunsemüller, pp. 547–549.

*Primary Examiner*—Robert Raevis
*Attorney, Agent, or Firm*—Evenson, McKeown, Edwards & Lenahan

[57] ABSTRACT

A device for measuring mechanical states of stress in components has a part of the device positively joined to the component whose mechanical states of stress are to be measured. The part of the device undergoes a change in a measurable variable in the event of a change in the mechanical states of stress. The part of the device is a layer which is deposited on the component and which has a layer structure containing less than 8% by weight of phosphorous, preferably up to 3% by weight of phosphorous, up to 2% by weight of an element of main group IV or V, in particular antimony, and up to 5% by weight of a transition metal element, in particular cobalt. The weight percentages resulting from the sum are increased up to 100% with nickel. The layer modifies the magnetic flux in a coil arrangement comprising at least one coil, and the change in the magnetic flux in the coil arrangement is evaluated and the mechanical state of stress of the component are deduced from the change in the magnetic flux.

13 Claims, 1 Drawing Sheet

DEVICE FOR MEASURING MECHANICAL STATES OF STRESS IN COMPONENTS

This application is a continuation of application Ser. No. 08/011,153, filed on Jan. 29, 1993, now abandoned.

BACKGROUND AND SUMMARY OF THE INVENTION

The invention relates to a device for measuring mechanical states of stress in components and, in particular, to a device for measuring mechanical states of stress in components wherein a part of the device is nonpositively joined to the component whose mechanical states of stress are to be measured. The part of the device undergoes a change in a measurable variable in the event of a change in the mechanical states of stress.

A device of the generic type is already known and is generally referred to as a strain gauge. These strain gauges are described, for example, in the German book entitled: *Meyer's Lexikon der Technik und der exakten Naturwissenschaften* (Meyer's Lexicon of Engineering and the Exact Sciences), Bibliographisches Institut AG, Mannheim 1969, to the effect that a resistance wire is glued in loop or zigzag form to a paper or plastic strip as a substrate. The strain gauge obtained in this manner is then glued onto an object to be measured. The length and the cross section of the resistance wire and, consequently, also the resulting resistance then change as a result of expansions or contractions of the object to be measured. Expansions or contractions of the object to be measured are deduced from this change in resistance.

In the device hitherto known, disadvantages arise to the effect that the resolution of the strain gauges is limited by the fact that the strain gauges are only glued on to the object to be measured. The resolution is then limited by the fact that small expansions or contractions which are not transmitted by the glue layer can also not be detected.

There is, therefore, needed a device for measuring mechanical states of stress in components in such a way that the device has as high a response sensitivity as possible and, at the same time, operates as independently as possible of the ambient conditions.

According to the invention, these needs are met by a device for measuring mechanical states of stress in components wherein part of the device is nonpositively joined to the component whose mechanical states of stress are to be measured and the part of the device undergoing a change in a measurable variable in the event of a change in the mechanical states of stress. The part of the device is a layer which is deposited on the component by atomic growth. The part has a layer structure containing less than 8% by weight of phosphorus, preferably up to 3% by weight of phosphorus, up to 2% by weight of an element of main group IV or V, in particular antimony or lead, and up to 5% of a transition metal element, in particular cobalt or iron. The percentages by weight resulting from the sum are increased to 100% with nickel. The layer modifies the magnetic flux in a coil arrangement comprising at least one coil. This change in the magnetic flux in the coil arrangement is evaluated and the mechanical state of stress of the component is deduced from the change in the magnetic flux.

Further advantages of the invention compared with the known prior art are that the device according to the invention has only a low overall height on the object to be measured.

Ceramic materials which are used, for example, in turbocharger rotors or valves in motor-vehicle construction have a high mechanical rigidity. If stresses are to be measured, problems occur to the effect that the mechanical stresses result only in small changes in length because of the high mechanical rigidity. These small changes in length can be measured with surprisingly good resolution by amorphous or nanocrystalline layers which are deposited directly on the component and have a high magnetoelasticity.

Other objects, advantages and novel features of the present invention will become apparent from the following detailed description of the invention when considered in conjunction with the accompanying drawings.

DETAILED DESCRIPTION OF THE DRAWINGS

Figure 1:
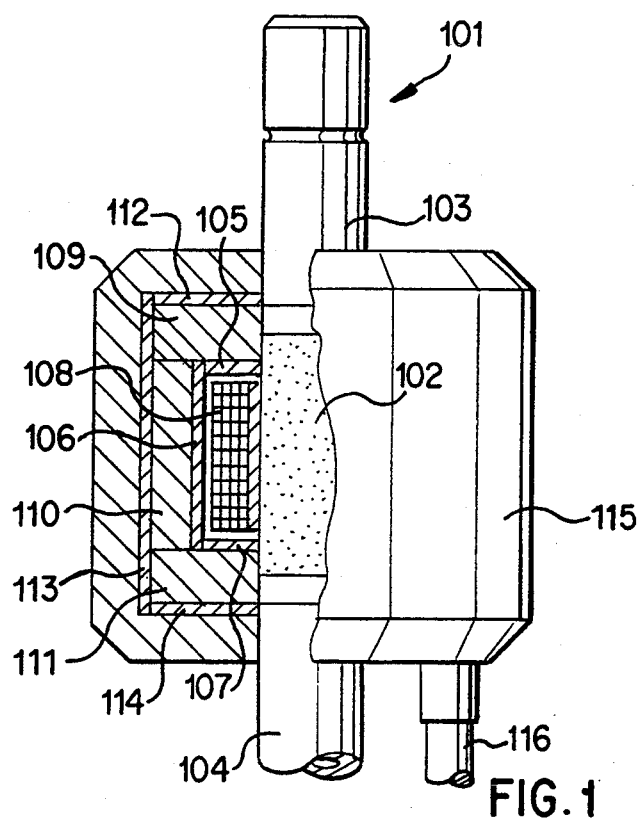
FIG. 1 is a partial cross-section view of a first exemplary embodiment of a device according to the invention for measuring of contraction or expansion.

FIG. 1 shows a first device according to the invention which has a layer having certain properties. A suitable composition of a layer with the required properties consists in adopting a layer structure containing less than 8% by weight of phosphorus, but preferably less than 3% by weight of phosphorus, less than 2% by weight of antimony and less than 5% by weight of cobalt, the percentages by weight resulting from the sum being made up to 100% with nickel. It is also possible to use, instead of Co, another transition metal. Equally, instead of Sb, another rare-earth element may also be used.

The transition metal brings about an increase in the crystallization temperature of the layer from approximately 600° K. to greater than 700° K. The Curie point is likewise increased to a value of greater than 700° K. by the transition metal.

As a result of the high proportion of atomic bonds, the rare-earth element brings about an appreciable increase in the electrical resistivity, thereby providing a particularly efficient attenuation of the eddy currents.

The phosphorus content of the layer is responsible for the soft-magnetic properties of the layer. A P component of more than 3% by weight results in a decrease in the magnetostriction.

The surface of the substrate upon which the layer is to be deposited must first be rendered electrically conducting so that the ions can be deposited on the substrate. This can be done, for example, by first coating the surface by vapor deposition. The substrate is then immersed in an alkaline bath composed of the elements according to the above list, account being taken of the respective percentages by weight. The layer can then be deposited on the surface of the substrate electrolytically at a temperature of approximately 370° K.

So that the layer can be effectively protected against external magnetic fields, two further soft-magnetic non-magnetostrictive layer rings are additionally deposited on the component by one of the processes mentioned. The components 112, 113, 114 or 213, 214, 215 described below, together with the two layer rings 103, 104 or 216, 217 then form the magnetic screening. To protect the measuring layer mechanically and chemically, a layer having a higher P content (greater-than 8% by weight of phosphorus) is then deposited in turn. In this connection, the measuring layer may have a composition $A_{1-x}B_x$. Here A may be a mixture of, preferably, two ferromagnetic transition metals M1 and M2, in which case M1 may be Ni, and M2 Co, and B may be a mixture of metalloids m1 and m2, in which case m1 may be P, and m2 Sb. A possible quantitative ratio may be composed of $(M1_{0.9}, M2_{0.1})_{0.8}(m1_{0.5}, m2_{0.5})_{0.2}$. The magnetostriction constant can in principle be varied by the composition of the layer. With a continuous change in the quantitative ratio of M1, M2 from 9:1 to 1:9, the magnetostriction constant converts from negative to positive sign, a minimum magnetostriction being passed through at a quantitative ratio of approximately 1:1.

FIG. 1 shows a valve shaft 101 on which the (measuring) layer 102 and the two layer rings 103 and 104 have been deposited. Here the layer 102 has a structure which was described in the above paragraphs and forms, together with the components 105, 106 and 107, the magnetic flux return path for the coil 108. The components 105, 106 and 107 are composed of a softmagnetic material which also has a low magnetostriction. The magnetic permeability of the layer 102 changes as a result of mechanical stresses (expansion or contraction) of the valve shaft 101 because of the magnetoelastic properties of the layer 102. Consequently, the inductance of the coil 108 then also changes. This change in the impedance can then be evaluated with an evaluation system which is known per se. The mechanical stress on the valve shaft 101 can then be deduced from the change in the impedance of the coil 108.

Advantageously, interference effects can be eliminated by further components. For example, the components 105, 106 and 107 may be surrounded by the components 109, 110 and 111, which are spacers composed of an electrically insulating and nonmagnetic material, for example of a suitable plastic. The components may then be surrounded in turn by the components 112, 113 and 114 which, for the purpose of screening against interfering external magnetic fields, are composed of a highly soft-magnetic material having a high electrical resistivity. In this design, the entire arrangement is encapsulated in a plastic material 115 in the exemplary embodiment of FIG. 1. The coil 108 is connected by the connector 116 to the evaluation system which is not shown in greater detail here.

Figure 2:
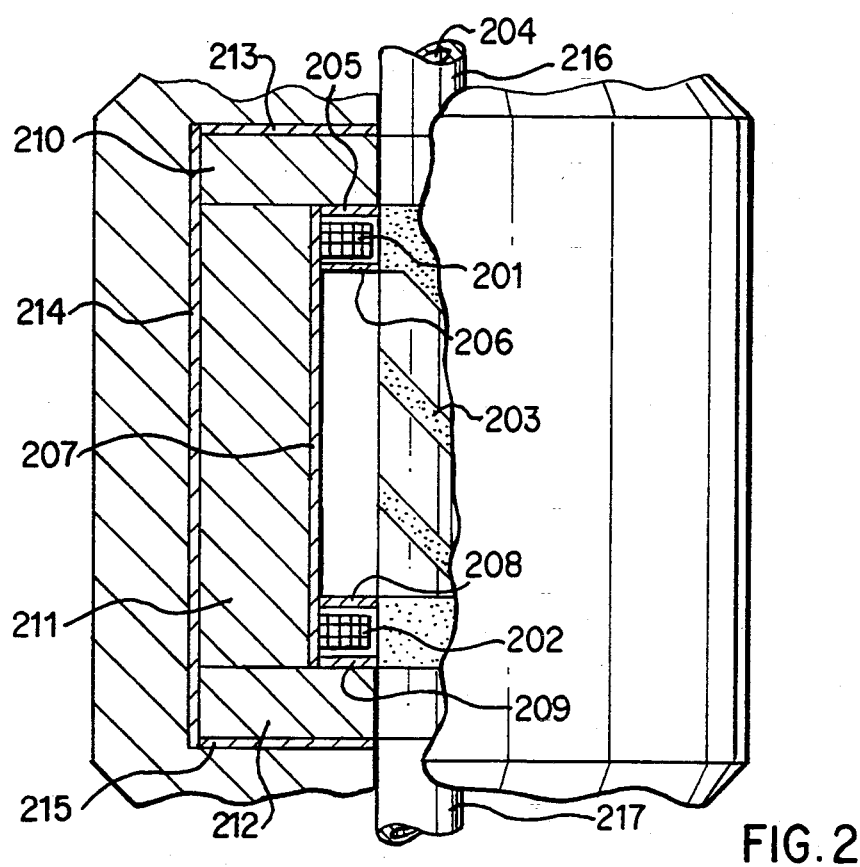
FIG. 2 is a partial cross-section view of a second exemplary embodiment of a device according to the invention for measuring torsions.

FIG. 2 shows a second exemplar. Y embodiment of a device according to the invention. In this case, two coils 201 and 202 are provided which are transformer-coupled. A magnetic flux is introduced into the layer 203 by means of the coil 201. That is to say, the coil 201 acts as primary coil. The magnetic flux is sensed by means of the coil 202. That is to say, the coil 202 acts as secondary coil. In this design, the layer 203 is deposited in the form of a helix along the valve shaft 204. The layer 203 is terminated in each case in the form of a ring at the ends immediately opposite the coils 201 and 202. Consequently, mechanical stresses arise in the layer 203 as a result of a torsion in the valve shaft 204. The torsion results in a change in the magnetic flux in the coil 202 as a result of the magnetoelasticity of the layer 203 because of the method of application of the layer 203 to the valve shaft 204. The change in the magnetic flux brings about an induction of a voltage in the coil 202 and this is consequently a measure of the torsion which has occurred.

The arrangement of the other components of FIG. 2 serves to optimize the magnetic flux and the screening from external magnetic fields. The following analogies exist between the components of FIG. 2 and those of FIG. 1 in relation to operation and, consequently, also to the nature of the materials to be used. The components 205, 206, 207, 208 and 209 correspond to the components 105, 106 and 107, and the components 210, 211 and 212 correspond to the components 109, 110 and 111. The components 213, 214 and 215 correspond to the components 112, 113 and 114. The component corresponding to the plastic body 115 is not shown in greater detail in FIG. 2. The layer rings 216 and 217 correspond to the layer rings 103 and 104.

In principle, such measurements are not limited to the valve shaft described in the two exemplary embodiments. On the contrary, the device can also be mounted on other components in which a contraction or an expansion in a particular direction, or a torsion, is to be measured.

Likewise, the casings composed of one material and comprising a plurality of components in the exemplary embodiments may also comprise only one component of the appropriate shape.

The deposition of the layer 102, 203; 103, 104; 216, 217 can be carried out by atomic growth by chemical reduction at the surface, by electrolytic deposition, by PVD (physical vapor deposition) of CVD (chemical vapor deposition) processes or by ion implantation, or by variations of the processes mentioned (plasma, laser, ultrasound and the like).

Furthermore, for the purpose of optimizing the electrical resistivity and the magnetic properties of the layer, the layer may also be doped with traces of rare earth metals.

Fine solid powders, for example oxides, carbides or plastics, such as Hostasflon or the like, may furthermore also be added to the layer. This achieves the result that the solids dispersibly incorporated in the layer make the migration of the Bloch walls difficult and, consequently, increase the magnetostriction properties of the layer.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for measuring mechanical states of stress in a component, comprising:

a part of said device being non-positively joined to said component whose mechanical states of stress are to be measured, said part undergoing a change in a measurable variable in the event of a change in the mechanical states of stress;

wherein said part of the device is a layer deposited on the component by atomic growth, said layer having a layer structure consisting of less than 8% by weight of phosphorous, up to 2% by weight of one of antimony and lead elements, and up to 5% by weight of one of cobalt and iron elements, a remaining sum of said percentages by weight being increased to 100% with nickel; and a coil arrangement comprising at least one coil, wherein said layer changes its magnetic permeability when the mechanical states of stress are applied and influences a magnetic flux in said coil arrangement, said modification of the magnetic flux is evaluated and the mechanical states of stress of the component are deduced from the changes in the magnetic flux.

2. A device according to claim 1, wherein said layer contains 3% by weight of phosphorous.

3. A device according to claim 1, wherein the coil arrangement comprises a coil which is disposed coaxially with respect to the component and surrounds the component, and in that the top, bottom and outer surface of the coil is surrounded by components composed of a soft-magnetic material which also has low magnetostriction.

4. A device according to claim 3, wherein the components surrounding the coil arrangement are surrounded by further components composed of an electrically insulating and nonmagnetic material.

5. A device according to claim 4, wherein said insulating and non-magnetic material is a plastic.

6. A device according to claim 4, wherein the components are furthermore surrounded by additional components composed of a highly soft-magnetic material having a high electrical resistivity.

7. A device according to claim 1, wherein the layer is doped with traces of rare-earth metals.

8. A device according to claim 1, wherein fine solid powders are added to the layer, said powders include at least one of oxides, carbides and plastics.

9. A device according to claim 1, wherein there are located on the component at an axial distance from the layer in each case rings which have a layer structure with the same composition as said layer.

10. A device for measuring mechanical states of stress in a component, comprising:
  a part of said device being non-positively joined to said component whose mechanical states of stress are to be measured, said part undergoing a change in a measurable variable in the event of a change in the mechanical states of stress;
  wherein said part of the device is a layer deposited on the component by atomic growth, said layer having a layer structure consisting of less than 8% by weight of phosphorous, up to 2% by weight of an element from one of main groups IV and V, of the Periodic System of Elements, and up to 5% by weight of a transition metal element, a remaining sum of said percentages by weight being increased to 100% with nickel;
  a coil arrangement comprising two coils wherein said layer changes its magnetic permeability when the mechanical states of stress are applied and influences a magnetic flux in said coil arrangement, said modification of the magnetic flux is evaluated and the mechanical states of stress of the component are deduced from the changes in the magnetic flux; and
  wherein the layer is deposited on the component in a helically extending strip, said strip having a strip completely surrounding the component at its upper and lower termination in each case, each of these two strips being coaxially surrounded by one of said coils of the coil arrangement, said two coils being transformer-coupled and the mechanical state of stress of the component being deduced from the output signal of the secondary coil, and in that the top, bottom and outside surface of the coils and the joint of the outside surfaces of the coils are surrounded by components composed of a soft-magnetic material which has low magnetostriction.

11. A device according to claim 10, wherein the components surrounding the coil arrangement are surrounded by further components composed of an electrically insulating and nonmagnetic material.

12. A device according to claim 11, wherein said insulating and non-magnetic material is a plastic.

13. A device according to claim 10, wherein the device resulting from the additional components is encapsulated in a plastic material.

* * * * *